March 22, 1966 K. G. KUGLER 3,241,440
ILLUMINATION SYSTEM
Filed Dec. 26, 1963
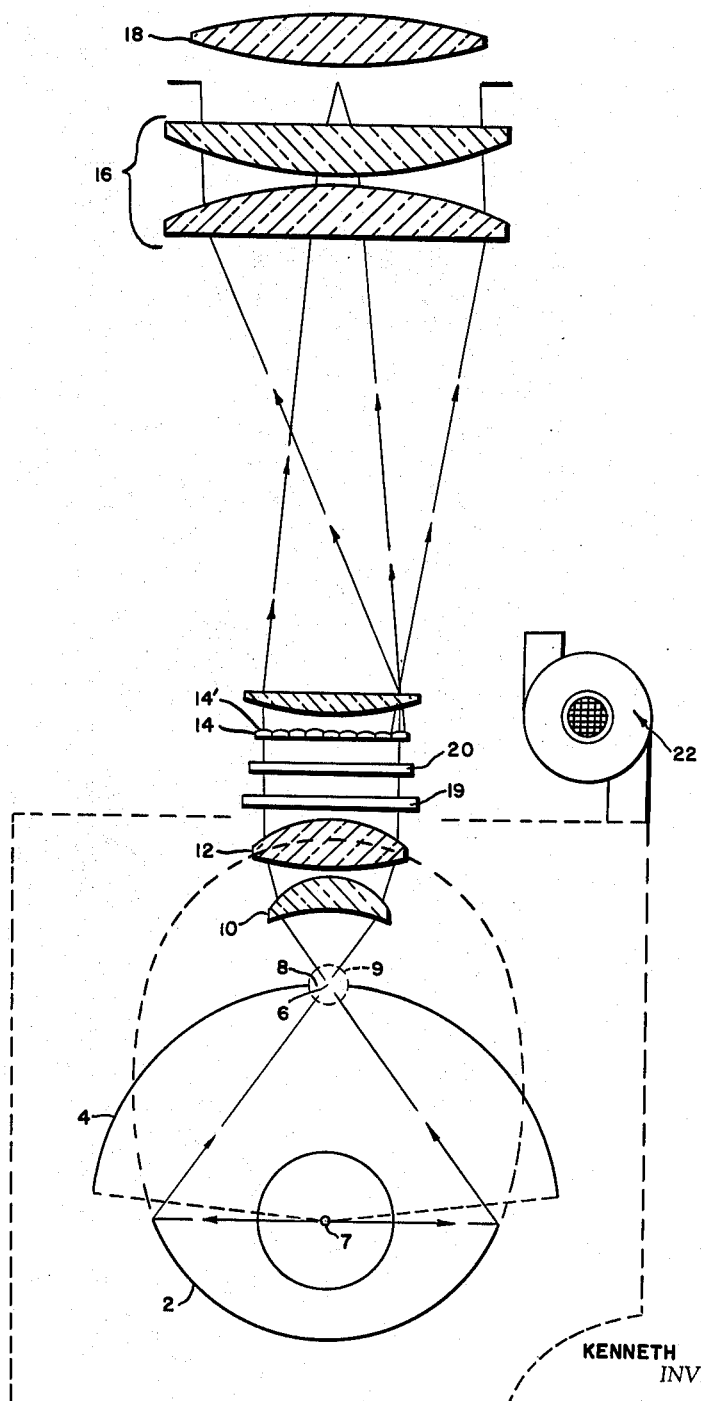
KENNETH G. KUGLER
INVENTOR.
BY Frank C. Parker
David E. Dougherty
ATTORNEYS

3,241,440
ILLUMINATION SYSTEM
Kenneth G. Kugler, Rochester, N.Y., assignor to Bausch & Lomb Incorporated, Rochester, N.Y., a corporation of New York
Filed Dec. 26, 1963, Ser. No. 333,411
2 Claims. (Cl. 88—24)

This invention relates to a high intensity illumination system and more particularly to an illumination system for evenly illuminating relatively large formats.

Optical enlarging systems of the type used to illuminate relatively large formats normally have a comparatively long focal length and a high speed projection lens. Relatively strict requirements for high resolution and low distortion limits the degree of freedom in the optical design of such systems, and accordingly, the systems have comparatively small half field angles which permit near diffraction limited performance, and eveness of illumination in the image plane. While this approach has been relatively successful, such systems normally include relatively large optical elements and a large entrance pupil which requires a high condenser magnification of the light source in order to properly illuminate the entrance pupil.

The relatively high intensity light sources required to illuminate and enlarge the relatively large object formats inherently have small arc flames. The increased output is required in order to obtain an exposure time of reasonable duration with a high resolution film. Films of this type are notoriously slow and usually have their greatest sensitivity in the blue-green spectral region. Accordingly, a short arc mercury or mercury-xenon light source, or a carbon arc are utilized. Films of these types require lens achromatization in the blue-green spectral region. Achromatization in the blue-green spectral region is particularly difficult with the presently available glasses. Therefore, filtering means are employed, which further reduces the usable energy emanating from the light source.

Short arc lamps produce a relatively small and uneven light source. Accordingly, it is relatively difficult to design a condenser system to be used in conjunction with a short arc lamp. For example, it is relatively difficult to cover a particularly large format with a system of this type. The condenser system should cover the given format, fill the large entrance pupil of a projection lens and provide even illumination. An additional difficulty encountered in the use of short arc lamps relates to the physical size of the envelope and the position of the electrodes. For example, the size of the envelope and position of the electrodes tends to limit the collecting cone angle and condenser magnification. Attempts to utilize a longer focal length which would permit higher condenser magnification are also limited, since the entrance pupil increases in direct proportion with the focal length in order to maintain a relatively fast lens speed.

Elliptical reflectors and spherical reflectors have heretofore been used for forming a source image at a film gate in a projection system. In such systems, the spherical reflector is disposed close to the source, and inside the second focus of the elliptical reflector. Pebble beds or double rasters are also included in systems of this type in order to overcome a large central umbra. These systems are also relatively complex, since they are designed for converging light. In other systems wherein a window is provided in the spherical reflector, a relatively large aperture is required, since the second focus of the ellipse is at the film plane. Accordingly, there is a relatively large loss of uncontrolled light which emanates directly from the light source through this relatively large window.

Advantageously, a system according to the present invention incorporates an elliptical and a spherical reflector for forming an apparent new source of light at the second focus of the ellipse. The surface of the spherical reflector is coincident with the second focus of the ellipse. Combining this system with a condenser system and pebble bed have been found to provide very efficient illumination, and to produce relatively high performance image rendition. Furthermore, the use of a condenser system which picks up the enlarged image of the source at the second focus tends to minimize the light loss since the aperture may be of a minimum size. For example, only the size of the source and the paraxial magnification of the ellipse controls the diameter of the aperture.

Placing the surface of the spherical reflector at the focus of the ellipse and providing a small aperture in the sphere at the focus of the ellipse tends to minimize the loss. Ordinarily there would be a relatively large light loss since the condensers cannot be designed to simultaneously handle the direct light and the source image. Forming an image of the source at the surface of the apherical reflector also tends to overcome the design problems associated with a relatively large bulb envelope. Accordingly, a relatively small condenser may be placed relatively close to the apparent source. This reduces the necessity of high magnification of the condenser system. The condenser take-off angle from the aerial source has been substantially reduced by means of the elliptical reflector and the source so formed at the condenser emanates in a narrow cone angle which greatly simplifies the condenser design and thereby reduces the size of the first element.

Briefly, an illumination system according to the present invention comprises a concave spherical reflector which defines an aperture, and a confronting concave elliptical reflector. A high intensity light source is disposed at one focus of the elliptical reflector. A condenser lens and a pebble lens are disposed in optical series adjacent to the aperture defined by the spherical reflector with the condenser lens between the aperture and the pebble lens. The elliptical reflector directs light rays toward the aperture and through the condenser and pebble lenses. The light passing through the condenser and pebble lens is directed toward a projection lens assembly. Subsequent condensers are provided to fill the format and direct the rays toward the entrance pupil of the enlarging lens.

The invention will now be described in more detail in connection with the accompanying drawing; in which, The figure is a diagrammatic view illustrating an illumination system according to the present invention.

The novel combination shown in the drawing includes a concave elliptical reflector 2 and a concave spherical reflector 4 disposed in confronting relationship to the elliptical reflector 2. The surface of the spherical reflector 4 is disposed at the second focus 6 of the ellipse defined by the elliptical reflector 2 with the center of curvature at the first focus of the ellipse. Disposing the spherical reflector at the second focus of the elliptical reflector 2 makes it possible to minimize the diameter of the aperture 8 so that a minimum amount of direct light from a source 7 will pass through the aperture. An optimum aperture size may be found by multiplying the useful size of the light source by the paraxial magnification of the ellipse. For example a 3 to 1 magnification allows a desirably small condenser take-off angle without requiring a large aperture which would result in additional light loss. This overcomes the difficulty of attempting to design a condenser which would simultaneously handle the source image and the direct light rays.

A condenser system comprising a pair of condenser lenses 10 and 12 are disposed adjacent the aperture 8 and are preferably of quartz. In other cases additional condenser lenses may be desirable in this sub system. Quartz condensers are particularly desirable in conjunction with a mercury or mercury-xenon source. The condenser lenses 10 and 12 gather the light from an apparent source 9 which is formed at the second focus of the ellipse and essentially present collimated light to a pebble bed thereby simplifying the design and construction of the pebble bed. Since the light source 7 is disposed at the first focus of the elliptical reflector 2 the light rays are imaged at the second focus to thereby form the apparent source.

An enlarged image of the source 7 is formed by the elliptical reflector 2 at the aperture 8 in the spherical reflector 4. This eliminates the problem associated with designing a condenser system around a relatively large bulb envelope. Therefore, relatively small condensers may be disposed relatively close to the apparent source to thereby reduce the magnification required by the complete condenser system.

The condenser take-off angle from this aerial source has been substantially reduced by means of the elliptical reflector 2. The apparent source presented to the condenser is now emanating in a narrow cone angle prescribed by the ellipse. This narrow cone angle simplifies the condenser design and reduces the size of the first element 10.

The two step magnification of the source readily permits filling the entrance pupil of a projection lens and subsequently covering a large object format. Furthermore, the means for collecting the light from the original source allows nearly all of the complete annular emanating light envelope to be collected.

Even though the two step illumination system has a theoretically high collection efficiency, it produces illumination which is somewhat uneven. There are, for example, electrode shadows and unevenness caused by the irregularity of the arc flame. Furthermore, the elliptical reflector has varying magnification over the face of the ellipse which causes unevenness in the apparent source. To overcome these problems, a pebble lens array 14 is combined with the condenser system. Although each of the pebbles 14' does not receive the same amount of light, they are so constructed and arranged in combination with a subsequent condenser system 16 that each pebble 14' spreads the light incident thereupon over the entire object format and is imaged in the entrance pupil of a projection lens 18. The pebble lens which acts as an averaging or integrating device should be of sufficient size to fill the entrance pupil. The design of the reflectors, condensers and pebble bed are made according to conventional practice.

A heat filter 19 and band pass filter 20 are preferably disposed between the pebble lens 14 and condenser lens 12. The heat filter reduces the temperature at the film plane. The band pass filter 20 also tends to reduce the heat build-up by blocking out the light rays other than those in the blue portion of the spectrum. This is desirable in view of the high resolution photographic films which are most sensitive to blue light.

It has also been found desirable to coat the elliptical reflector 2 and spherical reflector 4 with a heat transmissive coating such as "Balcoating." This coating together with a blower 22 substantially reduces the heat build-up in the apparatus.

It should be understood that the above example is given by way of illustration and that numerous changes and modifications may be made in the above-mentioned devices without departing from the spirit or scope of the appended claims.

What is claimed is:

1. An illumination system including the combination of a concave spherical reflector defining an aperture and a coaxial confronting concave elliptical reflector, and a high intensity light source disposed at one focus of said elliptical reflector and concentric with the surface of said spherical reflector, said aperture being substantially disposed at the second focus of said elliptical reflector, a condenser lens which produces collimated light and a pebble lens disposed in optical series adjacent the aperture with the condenser lens between the aperture and said pebble lens, said elliptical reflector directing focusing light rays at the aperture and through the condenser lens and pebble lens, a projection lens and a second condenser lens disposed between said projection lens and said pebble lens on the optical axis of the system to thereby direct the light rays from the light source so as to fill the entrance pupil of the projection lens with an extremely even illumination.

2. An illumination system according to claim 1 in which a heat filter and a band pass filter are disposed between the first condenser lens and the pebble lens on the optical axis of the system.

References Cited by the Examiner

UNITED STATES PATENTS

| | | | |
|---|---|---|---|
| 1,256,522 | 2/1918 | Croxton | 88—24 |
| 1,275,120 | 8/1918 | Ballman et al. | 88—24 |
| 1,589,664 | 6/1926 | Ryland. | |
| 2,552,184 | 5/1951 | Koch | 88—24 |

FOREIGN PATENTS

| | | |
|---|---|---|
| 818,229 | 8/1959 | Great Britain. |
| 934,650 | 8/1963 | Great Britain. |

NORTON ANSHER, Primary Examiner.

H. H. FLANDERS, Assistant Examiner.